US008776981B2

(12) United States Patent
Gardelle et al.

(10) Patent No.: US 8,776,981 B2
(45) Date of Patent: Jul. 15, 2014

(54) STATIC TEMPORARY STORAGE DEVICE FOR MOTOR VEHICLE BODY PARTS

(75) Inventors: Yves Gardelle, Saint-Martin d'Heres (FR); Pierre Marcellier, Lyons (FR); Xavier Ottemer, Saint Georges d'Esperanche (FR)

(73) Assignee: Compagnie Plastic Omnium, Lyons (FR)

(*) Notice: Subject to any disclaimer, the term of this patent is extended or adjusted under 35 U.S.C. 154(b) by 250 days.

(21) Appl. No.: 13/382,964

(22) PCT Filed: Jul. 9, 2010

(86) PCT No.: PCT/FR2010/051453
§ 371 (c)(1),
(2), (4) Date: Apr. 23, 2012

(87) PCT Pub. No.: WO2011/004131
PCT Pub. Date: Jan. 13, 2011

(65) Prior Publication Data
US 2012/0193307 A1 Aug. 2, 2012

(30) Foreign Application Priority Data
Jul. 10, 2009 (FR) ...................................... 09 54844

(51) Int. Cl.
*B65G 1/08* (2006.01)
*B65G 1/04* (2006.01)

(52) U.S. Cl.
CPC ................ *B65G 1/08* (2013.01); *B65G 1/0457* (2013.01)
USPC ..................... 198/346; 198/465.4; 198/347.4; 198/523

(58) Field of Classification Search
USPC ................ 198/346, 465.4, 523, 347.1, 347.4; 211/49.1, 85.29, 162; 280/770
See application file for complete search history.

(56) References Cited

U.S. PATENT DOCUMENTS

| 2,565,820 | A | * | 8/1951 | Machanic | ........................ 280/38 |
| 3,499,539 | A | * | 3/1970 | Fisher | ........................ 211/59.2 |
| 4,717,305 | A | | 1/1988 | Edwards | |
| 6,164,440 | A | * | 12/2000 | Van Bree | ................. 198/867.11 |
| 6,227,387 | B1 | * | 5/2001 | Rose | .......................... 211/85.29 |
| 6,648,153 | B2 | * | 11/2003 | Holmes | ....................... 211/85.15 |
| 6,976,595 | B1 | * | 12/2005 | Geller | ......................... 211/94.01 |
| 7,789,019 | B2 | | 9/2010 | Kato | |
| 2002/0040879 | A1 | * | 4/2002 | Barrett et al. | ................. 211/59.2 |
| 2007/0029164 | A1 | | 2/2007 | Bree | |
| 2007/0145201 | A1 | | 6/2007 | Ottemer et al. | |
| 2007/0251906 | A1 | * | 11/2007 | Corl | .............................. 211/162 |
| 2009/0120320 | A1 | | 5/2009 | Kato | |

FOREIGN PATENT DOCUMENTS

| CN | 200999154 | 1/2008 |
| CN | 1014343341 | 5/2009 |

(Continued)

*Primary Examiner* — Mark A Deuble
(74) *Attorney, Agent, or Firm* — Jacox, Meckstroth & Jenkins

(57) ABSTRACT

A static temporary storage device for motor vehicle body parts, the device has a stationary frame; at least two stationary parallel rails that are mounted horizontally or in a slightly angled manner on the frame, each rail being capable of supporting a bearing fitted onto the rail so as to be longitudinally movable on the rail; at least one carriage having bearing fitted onto the rail, the carriage being dimensioned so as to rest on both rails by means of the support; A device or means for suspending a body part from the carriage; each carriage extending longitudinally relative to the rails over a length that is shorter than the longitudinal extent of a body part when in its suspended position.

19 Claims, 3 Drawing Sheets

(56) References Cited

FOREIGN PATENT DOCUMENTS

| | | |
|---|---|---|
| DE | 3900616 | 7/1989 |
| DE | 4100234 | 7/1992 |
| FR | 2895375 | 6/2007 |
| JP | 61037608 | 3/1986 |
| WO | 2010012943 | 2/2010 |

\* cited by examiner

STATIC TEMPORARY STORAGE DEVICE FOR MOTOR VEHICLE BODY PARTS

CROSS-REFERENCE TO RELATED APPLICATIONS

This application is the U.S. National Phase application of PCT/FR2010/051453 filed Jul. 9, 2010, which claims priority to French Application No. 0954844 filed Jul. 10, 2009, which applications are incorporated herein by reference and made a part hereof.

BACKGROUND OF THE INVENTION

1. Field of the Invention

The present invention relates to a static temporary storage device for motor vehicle body parts.

2. Description of the Related Art

In the present description, the term "body part" means a part made of plastics material or of metal that belongs to the visible outer shell of a motor vehicle. A body part may comprise a single piece, or it may be constituted by an assembly of a plurality of pieces, and it may be bare or it may be fitted with components.

In particular, the term "bumper skin" is used to mean a body part forming a front or rear shield for a motor vehicle, the shield being made up of a single piece of plastics material or of metal or of an assembly of such pieces, and the term is used regardless of the fabrication stage of the part, i.e. regardless of whether the body part is partially or completely finished.

Document FR 2 895 375 A1 discloses a device for storing bumper skins, which device enables the bumper skins to be transported while protecting them effectively against scratching or marking.

The bumper skins are packaged in protective covers that are suspended individually from a rack having horizontal rails, each rack being slidable along the rails to enable the bumper skins to be loaded and unloaded on and off the storage device. The storage device is designed to be loaded on a transport vehicle to convey bumper skins according to a conventional logistics system. In the cited prior art, the protective covers serve not only to protect the bumper skins, but also to enable a larger number of bumper skins to be loaded in each storage device.

The present invention relates to a static temporary storage device for motor vehicle body parts. Such a device is useful on the manufacturing site of parts in order to complete an intermediate or final treatment method, e.g. in order to allow the parts to cool or to allow a coating to harden, and/or to store them while waiting to be sent to a mounting site on a vehicle.

Static temporary storage devices for bumper skins are in particular:

stationary shelves, the bumper skins being placed in the position they are to occupy on a vehicle in specially storage conditions; or sheets suspended from stationary racks; or stationary horizontal bars on which the bumper skins are placed with their overriders pointing downwards.

In those known devices, the bumper skins are stored so as to best protect them, but at a storage density that is not optimized. In addition, handling of the devices in order to transport them to a mounting site constitutes an operation that is relatively burdensome, possibly requiring the use of power-lift trucks (also known as fork-lift trucks).

SUMMARY OF THE INVENTION

The present invention seeks to provide a static temporary storage device with facilitated loading and unloading, and providing loading density that can be increased without running the risk of damaging the bumper skins.

Accordingly, the invention provides a static temporary storage device for motor vehicle body parts, wherein the device comprises:

at least two stationary parallel rails that are mounted horizontally or in a slightly angled manner on the frame, each rail being capable of supporting a bearing fitted onto the rail so as to be longitudinally movable on the rail;

at least one carriage having bearings fitted onto the rail, the carriage being dimensioned so as to rest on both rails by means of the bearings; and means for suspending a body part from the carriage; each carriage extending, longitudinally relative to the rails over a length that is shorter than the longitudinal extent of a body part, in a suspended position thereof, and preferably less than the nesting pitch of the body parts if they are capable of being nested one inside the other.

In an embodiment that is adapted to bumper skins, the longitudinal dimension (relative to the rails) of the carriages is thus preferably less than 25 centimeters (cm) or approximately 9.84 inches.

The device may also include protective covers, each containing a body part.

By way of example, the suspension means may be constituted by straps forming loops that pass under the body parts, or by the covers only.

The suspension means and possibly the covers are shaped in such a manner that the extent of two adjacent body parts is less than twice the extent of a single body part.

In the context of temporary storage, suspending the body parts from carriages makes it possible firstly to increase the loading density, thereby providing an economic advantage since the storage space occupied on the manufacturing site of the body parts is smaller, and secondly to avoid certain kinds of handling that would otherwise be necessary in order to manage bulky temporary stock.

In a particular embodiment of the invention, the device includes at least one separator suitable for placing between two body parts carried by two adjacent carriages, so as to prevent the body parts from being damaged if they approach each other.

An advantage of separators is that the body parts can be placed tightly one against another without damage when the carriages that support the body parts are juxtaposed. The function of the separators may be performed either by providing spacing or by providing protection, however in either event the separators should encourage fitting of the body parts tightly together so as to increase the loading density of the temporary storage device of the invention.

A separator according to the invention is constituted by two extra thicknesses formed on the suspension straps, which extra thicknesses bear against one another so as to form spacers between two body parts. Thus, the straps act both as suspension means and as separators.

Another separator according to the invention is constituted by a curtain of flexible and damping material, such as a thick fabric, the curtain being suspended from a carriage in front of or behind the body part supported thereby, so as to protect it if it is moved close to an adjacent body part.

Another separator according to the invention is constituted by a protective cover that acts both as suspension means and as a separator.

A protective cover may also be used together with suspension straps.

Having recourse to suspended covers provides the advantage that the body parts are protected during their temporary storage without requiring repackaging after transport, since they can be transported beforehand in the same cover. They may be transferred on a set of movable racks in a truck from a first site to a second site having a static temporary storage device according to the invention. Advantageously, it is possible for this purpose to make use of movable racks that are arranged to be capable of receiving the same carriages as those of the static storage device according to the invention, or at least the same covers.

Such a cover may cover, in particular completely, the body part on a single one of its faces. Thus, since a body part is generally rounded in shape, the cover preferably covers the concave face of the part and preferably leaves its convex face uncovered, thereby enabling the body parts to be nested one in another. Furthermore, the convex face of the body part, which is generally its visible face, is protected from the impacts that might occur while the parts are being handled. This embodiment also reduces the space occupied by the adjacent parts, since only one thickness of cover is present between two body parts.

A cover may also have an elastic border allowing it to fit around the shape of the body part. Such a cover is very simple to put into place on the body part.

In its bottom portion, the cover may also include fasteners enabling another, identical cover to be fastened thereto. It is then possible to suspend a plurality of covers one below another from a single carriage, thereby forming a "bunch" of covers.

As a result, if it is necessary to transfer the carriages from a movable rack to a static storage device, the transfer operations are reduced, thereby achieving a non-negligible saving in time.

According to an advantageous embodiment of the invention, the rails are slightly angled so that the weight of each carriage, or in a variant the combined weight of each carriage together with at least one body part and the suspension means, suffices to cause the carriage to move along the rails under the effect of its own weight or, in a variant, under the effect of the combined weight of these three elements. Thus, the carriages naturally collect together at the lowest point of the rails, without consuming any energy. The movement of the carriages along the rails may give rise to jolting or even impacts between the carriages, so the fact that the body parts are suspended from the carriages constitutes an advantage of the combination of means constituting the invention. In particular, adjacent body parts carried by adjacent carriages may perform movements as a whole and thus avoid striking one another or any of them striking the walls of their own containers.

In a particular embodiment of the invention, each track has a smooth top face and the respective bearings fitted onto the rails have at least one skid or at least one wheel capable of moving on the smooth top face of a rail.

In another embodiment, the top face of the rail is constituted by juxtaposed wheels arranged side by side with their axes horizontal and perpendicular to the longitudinal direction of the rail, and the carriage bearings fitted onto the rails are merely legs with longitudinally smooth bottom faces that run along the wheels of the rail. In both of these embodiments, the wheels may be replaced by balls, or disks, or rollers.

In another embodiment, each rail presents a longitudinally smooth top face and each carriage bearing is a skid that slides on the top face of the rail. Under such circumstances, anti-friction material, e.g. of the fluorinated polymer type, may coat the top face of the rail or the bottom face of the skid.

In a particular embodiment of the invention, the bearings are guided along the rails by lips arranged at the margins of the top faces of each of the rails. Each lip projects towards the bearing and forms an abutment that prevents the bearing from leaving the rail while it is moving longitudinally, at least from leaving the rail in a direction perpendicular thereto.

Two different arrangements may then be envisaged for the lips:

"inside the rails" where the lips are on the side of each rail that is closest to the other rail; or "outside the rails" where the lips are on the side of each rail that is furthest from the other rail.

In addition, the abutments may be vertical or sloping. They are preferably rigid. When vertical they serve to retain the bearings on the rail. When sloping, they allow each bearing to overhang from the rail by rising a little up the abutment in the event of the carriage shifting or turning relative to the rails (a small amount of pivoting about a vertical axis, also referred to as "crabbing"). This risk of pivoting is particularly great when the dimensions of a carriage are designed to increase loading density and are therefore not favorable to keeping the carriage on the axis of the rails, i.e. when the ratio of its wheel base (about 2 meters (m)) to its longitudinal width (about 15 cm to 40 cm) encourages crabbing. When the abutments are sloping, a bearing that moves up an abutment generates a force tending to recenter the bearing, thus making it possible to return the carriage back onto the axis of the rails, assuming that the angles are suitably determined given the weights and the dimensions of the various elements in question. With vertical abutments, in the event of the carriage shifting or turning, there is a risk on the contrary that the carriage will become jammed between the abutments.

In an embodiment in which the abutments are placed inside the rails, the inventors have nevertheless observed, in unexplained manner, that instances of carriages jamming are considerably reduced if the abutments are vertical, and instances of carriages pivoting are likewise considerably reduced if the abutments are sloping.

These and other objects and advantages of the invention will be apparent from the following description, the accompanying drawings and the appended claims.

BRIEF DESCRIPTION OF THE
ACCOMPANYING DRAWINGS

In order to better understand the invention, there follows a description of embodiments given as examples that do not limit the scope of the invention, the description being given with reference to the accompanying drawings, in which.

Figure 1:
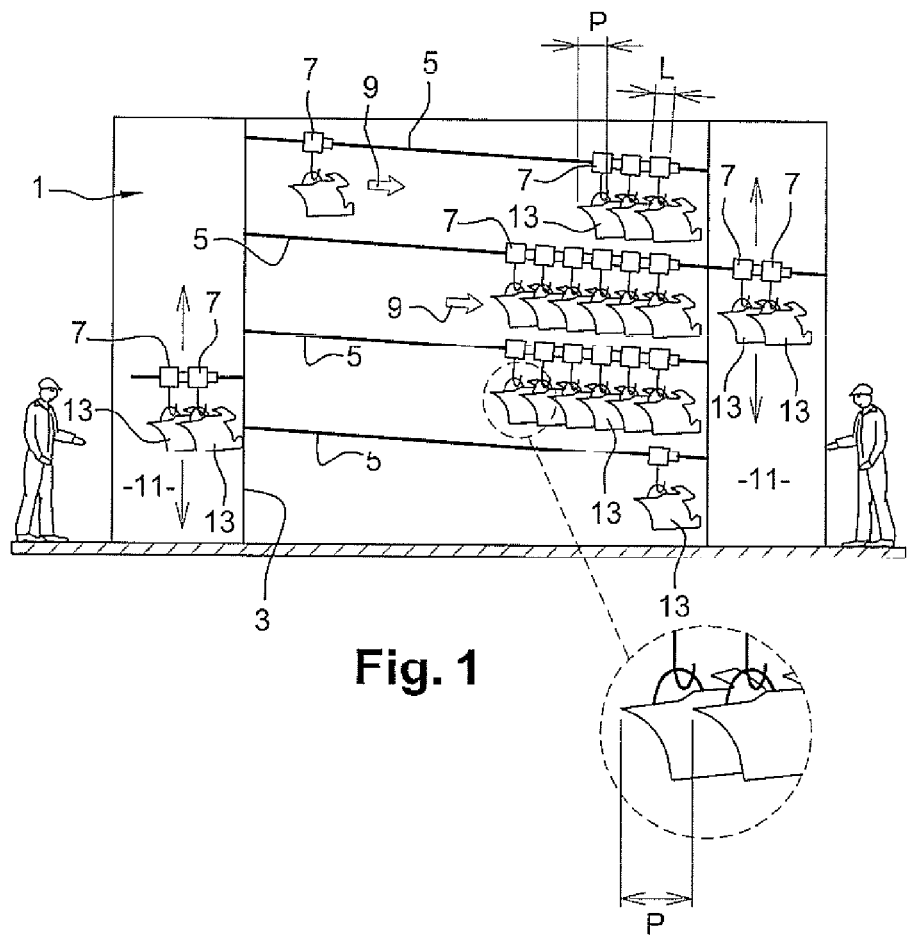
FIG. 1 is a diagrammatic view in elevation of a temporary storage device according to an embodiment.

DETAILED DESCRIPTION OF THE PREFERRED
EMBODIMENTS

In the drawings, the human figures that are shown diagrammatically serve to provide a dimensional reference.

In FIG. 1, the temporary storage device 1 is constituted by a frame 3 having four pairs of rails 5 mounted thereon to form four storage levels. Each pair of rails 5 are slightly angled so that carriages 7 sliding on the rails have a natural tendency to move in the directions indicated by the arrows 9.

On either side of the frame 3, elevators 11 are vertically movable to load or unload carriages 7 onto or off the pairs of rails 5.

Each carriage 7 supports one or more bumper skins 13, as described in detail with reference to the following figures.

Figure 2:
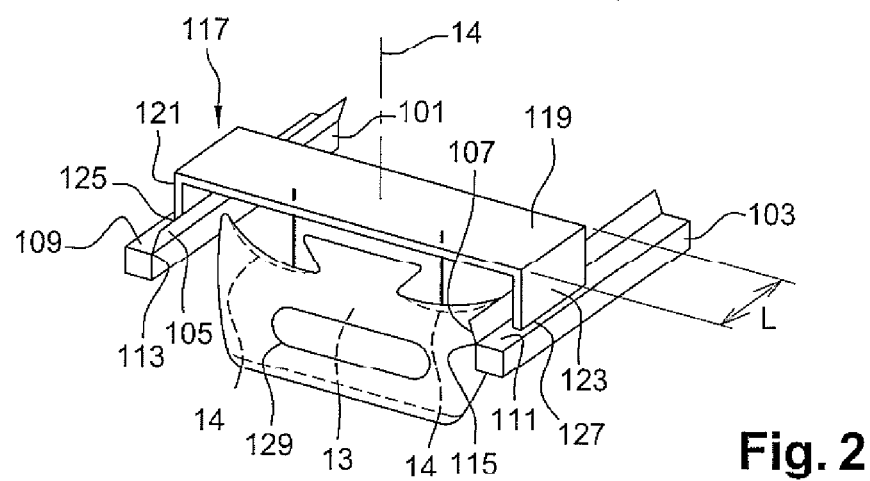
FIG. 2 is a perspective view of a carriage mounted on rails and carrying a bumper skin, according to a first embodiment.

In FIG. 2, two rails 101 and 103 of a pair 5 extend parallel to each other (only a segment of each rail is shown), the rails being spaced apart by a distance of 2 m. The rails are fastened to the frame 3. Each rail 101, 103 is constituted by a metal bar of square section and includes a respective lip 105, 107 projecting from its plane and smooth top face 109, 111, from a side thereof. The lips 105 and 107 are arranged on the insides of the rails, i.e. they begin from the respective edges 113, 115 of the rails that are the closest to the other rail. This arrangement of the lips 105 and 107 is said to be "inside". As can be seen better in FIG. 3, the lips 105, 107 slope inwards (i.e. towards each other), e.g. forming an angle of 45 degrees relative to the horizontal.

Thus, each lip 105, 107 forms a sloping abutment beside the smooth top face 109, 111 of each rail, which forms a rolling or sliding track for the bearings of a carriage.

In FIG. 2, the carriage 117 is a sliding carriage. It has a tray 119 with two legs 121 and 123, each of which possesses a skid 125, 127 constituting a bearing resting on the smooth and plane top face 109, 111 of a rail 101, 103. The interface between each skid 125, 127 and the corresponding rolling track 109, 111 is adapted to limit friction between these two surfaces.

The carriage is dimensioned so as to rest on the rails solely via its skids 125, 127 so that it can slide easily in the longitudinal direction.

The inclined lips 105 and 107 ensure that the skids 125 and 127 cannot easily escape from their sliding tracks.

Thus, the bearings 125 and 127 are guided along the rails 101 and 103 by the lips 105 and 107 arranged at the margins of the smooth top faces 109 and 111 of the rails, each lip projecting towards the bearing and forming an abutment that prevents the bearing from leaving the rail while moving longitudinally, at least from leaving the rail in a direction perpendicular thereto.

The carriage 117 presents a longitudinal extent L of 20 cm. The length of the skids must therefore not exceed this maximum extent of length L. Compared with the spacing of 2 m between the rails, the length of the skids is relatively short, thus tending to facilitate a small amount of pivoting of the carriage 117 about a vertical axis 14 on the rails 101 and 103 ("crabbing" of the carriage 117). Nevertheless, because of the inclined lips 105 and 107, the carriage remains on the axis of the rails and slides without jamming thereon.

The carriage 117 has suspension means in the form of a cover 129 that contains and protects a bumper skin 13, which skin is thus suspended from the tray 119 of the carriage 117 in the position that it is to occupy on a vehicle (also referred to as its "vehicle position"). The cover 129 also acts as a separator.

As is known, each bumper skin 13 possesses overriders 14 that give it a shape that is generally C-shaped when seen in plan view while in the vehicle position. This shape facilitates nesting of the bumper skins in pairs. Because of the small longitudinal extent L of each carriage 117, which is less than the longitudinal extent of a bumper skin in the vehicle position, two adjacent bumper skins 13 can engage one in the other, being separated by the two thicknesses of their covers 129. In other words, the minimum engagement pitch P of the bumper skins, i.e. their closest engagement (see detail of FIG. 1), is reached before two successive carriages on the rails come into contact via their longitudinal ends, and possibly without them ever coming into contact: the pitch P is therefore greater than the longitudinal dimension of a carriage. In this way, and as can be seen in FIG. 1, the loading density of the temporary storage device is optimized, since it depends solely on the shape of the bumper skins and of the separators used, and it is not imposed by the carriages.

Figure 3:
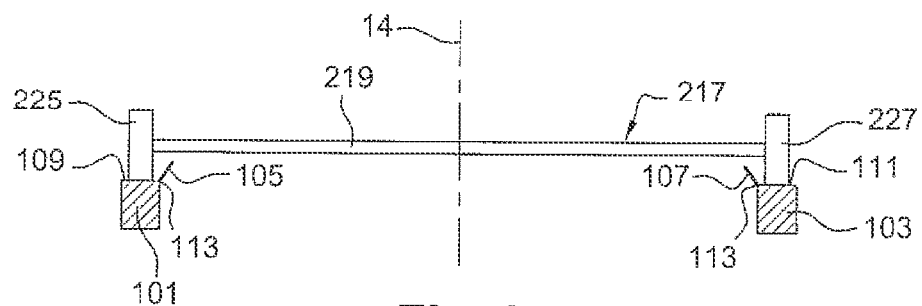
FIG. 3 is a section view on plane III-III of FIG. 2 showing a carriage according to a second embodiment.

FIG. 3 shows a wheeled carriage 217, i.e. that has wheels 225 and 227 at the ends of its tray 219. The carriage 217 is dimensioned so as to rest on the rails solely via its wheels 225 and 227, which constitute bearings that roll on the smooth top face 109, 110 of each rail, which top face then constitutes a rolling surface.

As with the carriage 117 of FIG. 2, the sloping abutments are constituted by lips 105 and 107 that prevent the wheels 225 and 227 from leaving their rolling surfaces 109 and 111, thereby straightening the carriage 217 should it start "crabbing".

This "inside" arrangement of the sloping lips 105 and 107 gives the best results in carriage straightening.

Thus, the bearings 225 and 227 are guided along the rails 101 and 103 by the lips 105 and 107 arranged at the margins of the smooth top faces 109, 111 of each of the rails, each lip projecting towards the support and forming an abutment that prevents the support from leaving the rail while moving longitudinally, at least from leaving the rail in a direction perpendicular thereto.

Figure 4:
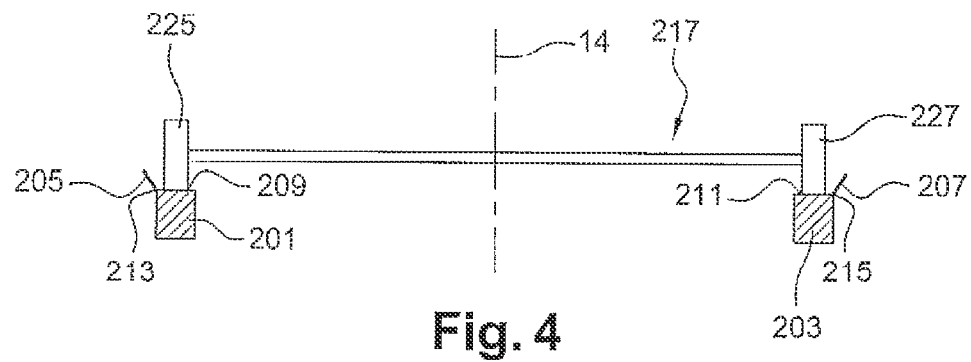
FIG. 4 is a view analogous to FIG. 3, the rails being made according to a second embodiment.

In the embodiment of FIG. 4, the same carriage 217 is moving on rails 201 and 203 that possess sloping lips 205 and 207 on their outsides, i.e. that begin from the top edges 213 and 215 of each of the rails that are furthest from the other rail. Each lip 205 and 207 slopes outwards, i.e. it extends upwards while going away from the other rail. As before, the lips 205 and 207 serve to hold the wheels 225 and 227 on their rolling surfaces 209 and 211.

Thus, the bearings 225 and 227 are guided along the rails 201 and 203 by the lips 205 and 207 arranged at the margins of the smooth top faces 209 and 211 of each of the rails, each lip projecting towards the bearing and forming an abutment that prevents the bearing from leaving the rail while it moves longitudinally, at least from leaving the rail in a direction perpendicular thereto.

Figure 5:
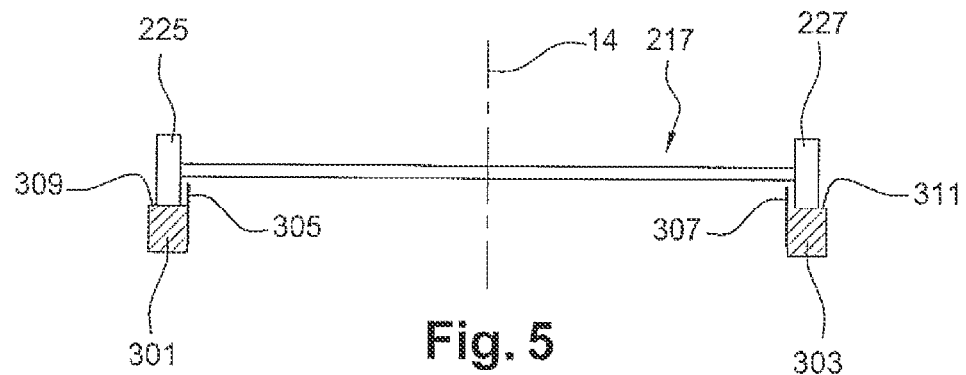
FIG. 5 is a view analogous to FIGS. 3 and 4, the rails being made according to a third embodiment.

The embodiment of FIG. 5 is a variant of the embodiment of FIG. 3, in which the lips 305 and 307 of the rails 301 and 303 are vertical instead of sloping. The lips 305 and 307 thus form vertical abutments that retain the wheels 225 and 227 on their rolling surfaces 309 and 311 without it being possible for them to rise up the lips in the event of "crabbing" of the carriage 217.

Thus, the supports 225 and 227 are guided along the rails 301 and 303 by the lips 305 and 307 arranged at the margins of the smooth top faces 309 and 311 of each of the rails, each lip projecting towards the bearing and forming an abutment that prevents the bearing from leaving the rail while it is moving longitudinally, at least from leaving the rail in a direction perpendicular thereto.

Selection between the embodiments of FIGS. 3 and 5, i.e. between sloping abutments and vertical abutments, depends on the clearances left between the wheels 225, 227 and the rails 101, 103 or 301, 303. When clearances are very tight, blocking the wheels 225, 227 on their rolling surfaces 309, 311, as shown in FIG. 5, can give results that are better than allowing them to rise up sloping abutments. In contrast, when clearances are slack, small amounts of pivoting of the carriage are inevitable, and it may be preferable to straighten the carriage more gently by means of sloping abutments that recenter it on the rolling surfaces 109, 111 of the rails 101, 103 without carriage jamming.

Figure 6:
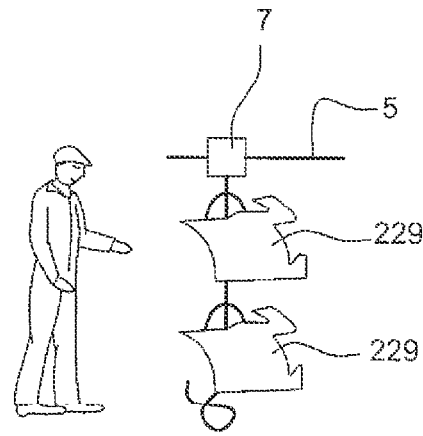
FIG. 6 is an elevation view of a carriage carrying two bumper skins that are superposed, according to a fifth embodiment.

FIG. 6 shows a carriage 7 on a portion of a pair of rails 5, the carriage 7 being provided with suspension means in the form of covers 229. Each cover 229 serves to suspend one bumper skin and possesses, in its bottom portion, fasteners enabling another, identical cover to be fastened thereto. Thus, in FIG. 6, two covers are suspended one above the other from a single carriage of the type described above.

Figure 7:
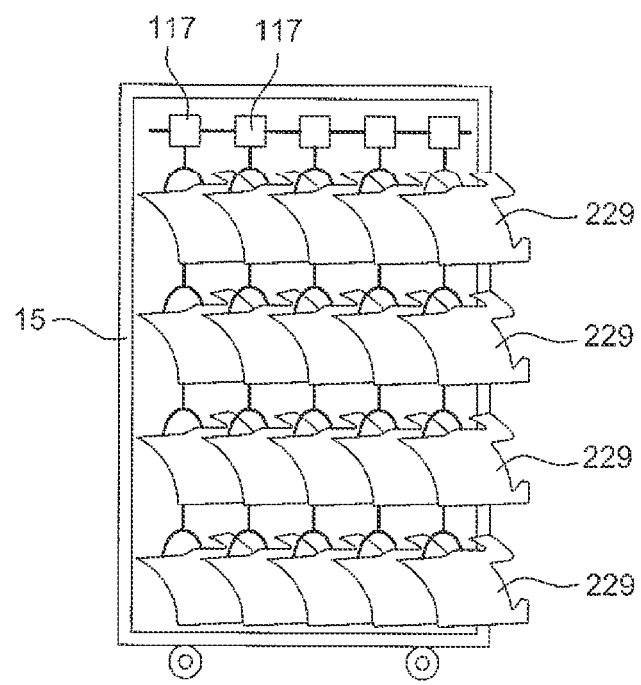
FIG. 7 is a diagrammatic elevation view of a movable rack carrying a plurality of bumper skins (shown here without any separators), suitable for use in combination with the temporary storage device of FIG. 5.

FIG. 7 shows a movable rack 15 designed to transport bumper skins in transport vehicles, in particular trucks. Such a movable rack 15 may be used in combination with the stationary temporary storage device 1 thanks to its ability to receive carriages 117 or 217 and covers 129, 229 that are identical to those described above. In the example shown, four levels of covers 229 are mounted on the rack 15. Thus, the bumper skins are packaged in the same manner both for temporary storage and for transport, and loading/unloading carriages on and off the storage device is made easier, thereby reducing handling while increasing loading density during transport.

Naturally, the embodiments described above are not limiting in any way the scope of the invention and they may receive any desirable modification without going beyond the scope of the claims.

While the process, device, product and system herein described constitute preferred embodiments of this invention, it is to be understood that the invention is not limited to this precise process, device, product and system, and that changes may be made therein without departing from the scope of the invention which is defined in the appended claims.

What is claimed is:

1. A static temporary storage device for motor vehicle body parts, wherein the device comprises:
    a stationary frame;
    at least two stationary parallel rails that are mounted horizontally or in a slightly angled manner on said stationary frame, each of said at least two stationary parallel rails being capable of supporting a bearing fitted onto said at least two stationary rails so as to be longitudinally movable on said at least two stationary rails;
    at least one carriage having bearings fitted onto each of said at least two stationary parallel rails, said at least one carriage being dimensioned so as to rest on each of said at least two stationary parallel rails by means of a support; and
    means for suspending a body part from said at least one carriage;
    each of said at least one carriage extending longitudinally relative to said at least two stationary parallel rails, over a length that is shorter than the longitudinal extent of a body part, in a suspended position thereof, at least one of said suspension means and at least one cover are shaped in such a manner that the extent of two body parts beside each other is less than twice the extent of a single body part.

2. The static temporary storage device according to claim 1, wherein each of said at least one carriage extends longitudinally relative to said at least two stationary parallel rails, over a length that is shorter than a nesting pitch of said body parts in their suspended position, assuming said body parts are capable of being nested in pairs when in their suspended position.

3. The static temporary storage device according claim 1, including at least one cover, each containing said body part.

4. The static temporary storage device according to claim 3, wherein at least one cover covers said body part on a single one of its faces.

5. The static temporary storage device according to claim 3, wherein said at least one cover includes an elastic border.

6. The static temporary storage device according to claim 3, wherein said at least one cover includes at its bottom portion fasteners enabling another, identical cover to be fastened thereto.

7. The static temporary storage device according to claim 1, wherein said suspension means, and possibly said at least one cover, are constituted by said at least one cover or by straps forming loops passing under each said body part.

8. The static temporary storage device according to claim 1, including at least one separator suitable for being placed between two of said body parts carried by two adjacent carriages in order to prevent said body parts from being damaged if they approach each other.

9. The static temporary storage device according to claim 4, including at least one separator suitable for being placed between two of said body parts carried by two adjacent carriages in order to prevent them from being damaged if they approach each other, wherein said at least one separator is constituted by extra thicknesses formed by suspension straps that bear against one another so as to form a spacer between two said body parts.

10. The static temporary storage device according to claim 8, wherein said at least one separator is constituted by a curtain of flexible and damping material, such as a thick fabric, suspended from a carriage in front of or behind said body part that it supports.

11. The static temporary storage device according to claim 8, wherein said at least one separator is constituted by a cover acting both as suspension means and as a separator.

12. The static temporary storage device according to claim 1, wherein each of said at least two stationary parallel rails has a smooth top face and each bearing fitted onto said at least two stationary parallel rails includes at least one skid or at least one wheel capable of moving on said smooth top face of said at least two stationary parallel rails, and wherein said bearings are guided along said at least two stationary parallel rails by lips arranged at the margin of said smooth top face of each of said at least two stationary parallel rails, each of said lips projecting towards said bearing and forming an abutment that prevents said bearing from leaving said at least two stationary parallel rails while it is moving longitudinally, at least from leaving said at least two stationary parallel rails in a direction perpendicular thereto.

13. The static temporary storage device according to claim 12, wherein said lips form vertical abutments, preferably rigid, that retain said bearings on said at least two stationary parallel rails.

14. The static temporary storage device according to claim 12, wherein said lips form sloping abutments that allow each of said bearings to overhang from said at least two stationary parallel rails by rising a little up the abutment, assuming that said at least one carriage shifts or turns relative to said at least two stationary parallel rails.

15. The static temporary storage device according to claim 3, wherein each of said at least one carriage extends longitudinally relative to said at least two stationary parallel rails, over a length that is shorter than a nesting pitch of said body parts in their suspended position, assuming said body parts are capable of being nested in pairs when in their suspended position.

16. The static temporary storage device according to claim 2, including at least one cover containing said body part.

17. The static temporary storage device according to claim 16, wherein at least one cover covers said body part on a single one of its faces.

18. The static temporary storage device according to claim 16, wherein said at least one cover includes an elastic border.

19. The static temporary storage device according to claim 16, wherein said at least one cover includes at its bottom portion fasteners enabling another, identical cover to be fastened thereto.

\* \* \* \* \*